United States Patent
Marumo et al.

[15] 3,671,504
[45] June 20, 1972

[54] METHOD FOR ELECTROSTATICALLY COATING SYNTHETIC RESIN MOLDINGS

[72] Inventors: Hideo Marumo; Morio Ninomiya, both of Tokyo; Shinro Watanabe, Ichikawa, all of Japan

[73] Assignee: Lion Fat & Oil Co., Ltd., Tokyo, Japan

[22] Filed: Dec. 21, 1970

[21] Appl. No.: 100,346

Related U.S. Application Data

[63] Continuation of Ser. No. 687,993, Dec. 5, 1967, abandoned.

[30] Foreign Application Priority Data

Dec. 8, 1966 Japan..................41/80070

[52] U.S. Cl. ............ 260/80.7, 260/77.5 D, 260/85.5 R, 260/92.8 A, 260/93.5 A, 260/93.7, 260/94.9 GR, 117/93.4 NC, 117/138.8 E, 117/138.8 R, 117/138.8 UA, 204/192

[51] Int. Cl. .................................................C08f 1/88

[58] Field of Search........... 260/77.5 D, 80.7, 85.5 R, 92.8 A, 260/93.7, 93.5 A, 94.9 GB

[56] References Cited

UNITED STATES PATENTS

| | | | |
|---|---|---|---|
| 2,528,378 | 10/1950 | Mannheimer | 260/309.6 |
| 2,781,354 | 2/1957 | Mannheimer | 260/309.6 |
| 2,982,651 | 5/1961 | Mackey | 260/309.6 |
| 3,316,232 | 4/1967 | McGann | 260/93.7 |

OTHER PUBLICATIONS

Encyc. of Polymer Science and Technology, 2, 204–213, Interscience, New York, (1965).

Encyc. of Chemical Technology, 3, 797–799, Interscience, New York (1964).

Journal of the Chemical Society of Japan, 68, No. 11, 2202–2286 (Nov. 1965).

Synthesis and Application of Surface Active Agents, 176–177, (July 31, 1966).

*Primary Examiner*—Joseph L. Schofer
*Assistant Examiner*—Stanford M. Levin
*Attorney*—Woodhams, Blanchard & Flynn

[57] ABSTRACT

Electrostatic coating of synthetic resin moldings is simplified by mixing in the synthetic resin from 0.1–5 wt. % of an amphoteric surface active agent of the formula

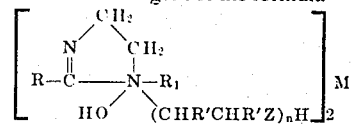

wherein:
R is a hydrocarbon radical having seven to 21 carbon atoms,
R' is selected from the group consisting of H and $-CH_3$,
Z is selected from the group consisting of $-O-$ and $-NH-$,
M is a metal ion selected from the group consisting of Mg, Ca, Zn, Ba and Fe,
$R_1$ is selected from the group consisting of $-R_2COO-$, $-R_2SO_3-$ and $-R_2OSO_3-$ (where $R_2$ is selected from the group consisting of $-CH_2-$, $-C_2H_4-$ or $-C_3H_6-$),
n is a number from 0 to 3.

6 Claims, No Drawings

METHOD FOR ELECTROSTATICALLY COATING SYNTHETIC RESIN MOLDINGS

CROSS-REFERENCE TO RELATED APPLICATION

This application is a continuation of our copending application, Ser. No. 687,993, filed Dec. 5, 1967 and now abandoned.

BACKGROUND OF THE INVENTION

The present invention is concerned with an improved electrostatic coating method which permits one to perform easily an electrostatic coating on various synthetic resins ranging widely in type by a simplified coating process due to the fact that a metal salt of an amphoteric surface active agent is mixed with the synthetic resin which is to be coated.

DESCRIPTION OF THE PRIOR ART

With the conventional methods for conducting electrostatic coating of synthetic resins, it has been impossible to obtain films of coatings having satisfactory adhesiveness unless the coating is performed after the resin moldings are subjected to the so-called precoating treatment which includes a series of treatments such as a dewaxing treatment, a washing treatment, an air-drying treatment (at 60° C – 70° C. for 20 minutes), a surface activating treatment (priming treatment) and an air-drying treatment, in that order. Also, the synthetic resins employed in such electrostatic coating methods of the prior art usually have been acrylonitrile-butadiene-styrene copolymers. Because of the reason that in the past it has been difficult to conduct coating of resins other than the above-mentioned copolymers, it has been the practice, in lieu of coating, to mix resins other than said copolymers with pigments by the employment of kneading techniques, for the purpose of improving the luster of the resins.

Despite the extensive strong demand in the past for simplification of the aforesaid completed process of precoating treatment which has been necessary for the electrostatic coating of synthetic resins in the past, and despite the keen demand for the development of a method which permits the electrostatic coating to be performed also on those resins which could not be coated electrostatically, there has been made, as yet, no effective and satisfactory proposal.

SUMMARY OF THE INVENTION

It is, therefore, the object of the present invention to provide a method which not only permits the electrostatic coating of said acrylonitrile-butadiene-styrene copolymers, but also makes it possible to perform electrostatic coating of various other synthetic resins ranging widely in type such as acrylonitrile-styrene copolymers, polystyrene, polyethylene, polypropylene, polyvinyl chloride and polycarbonate, and which, at the same time, can radically simplify the complicated precoating treatment.

DESCRIPTION OF THE PREFERRED EMBODIMENTS

The present invention provides a quite simple method having a great advantage, such as described above, by the employment of a material, as the article for being coated, which is composed of a synthetic resin mixed, by kneading, with a metal salt consisting of an amphoteric surface active agent expressed by the general formula:

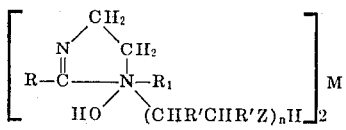

wherein:
R is a hydrocarbon radical having seven to 21 carbon atoms,
R' is selected from the group consisting of H and —CH$_3$,
Z is selected from the group consisting of —O— and —NH—

M is a metal ion selected from the group consisting of Mg, Ca, Zn, Ba and Fe,
R$_1$ is selected from the group consisting of —R$_2$COO—, —R$_2$SO$_3$— and —R$_2$OSO$_3$— Where R$_2$ is selected from the group consisting of —CH$_2$—, —C$_2$H— or —C$_3$H$_6$—),
n is a number from 0 to 3.

In the present invention, it is desirable to use a material, as the article to be coated, which is composed of a synthetic resin and a metal salt consisting of a surface active agent expressed by the foregoing general formula, said metal salt being mixed, by kneading, with said resin in an amount ranging from 0.1 to 5.0 percent by weight, preferably in the range of from 0.5 to 2.0 percent by weight, of the weight of said resin. Since the synthetic resin having undergone said treatment has a surface conductivity, it is possible to omit the surface activating treatment before performing electrostatic coating, and besides, a coating which is excellent in adhesiveness can be obtained.

As has been described, the present invention represents an improved coating method which not only makes it easy to perform electrostatic coating of resins by only subjecting said resins to a very simple treatment, but also enables one to carry out electrostatic coating on various types of resins which have been considered difficult to be coated electrostatically.

The hydrocarbon radicals having C$_7$–C$_{21}$ which are contained in the compounds used in the present invention and expressed by the aforesaid general formula include, for example, heptyl, octyl, nonyl, decyl, undecyl, dodecyl, tridecyl, tetradecyl, pentadecyl, hexadecyl, heptadecyl, 1-methyl hexyl, 1-methyl heptyl, 1-methyl octyl, 1-methyl nonyl, 1-methyl decyl, 1-methyl undecyl, 1-methyl dodecyl, 1-methyl tridecyl, 1-methyl tetradecyl, 1-methyl pentadecyl, 1-methyl hexadecyl, 1-methyl heptadecyl, 1-methyl octadecyl, 1,1-dimethyl pentyl, 1,1-dimethyl hexyl, 1,1-dimethyl heptyl, 1,1-dimethyl octyl, 1,1-dimethyl nonyl, 1,1-dimethyl decyl, 1,1-dimethyl undecyl, 1,1-dimethyl dodecyl, 1,1-dimethyl tridecyl, 1,1-dimethyl tetradecyl, 1,1-dimethyl pentadecyl, 1,1-dimethyl hexadecyl, 1,1-dimethyl heptadecyl, 1,1-dimethyl octadecyl and 8-heptadeceneyl. The metal moeity of the slat is a member of the group consisting of the magnesium ion, the calcium ion, the zinc ion, the barium ion and the ferrous ion.

EXAMPLE

The following compounds:

(1)
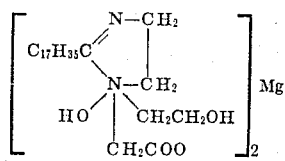

(2)
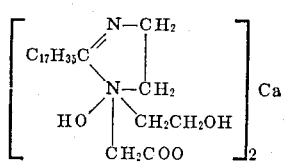

(3)
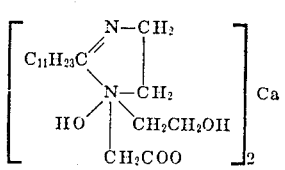

(4)
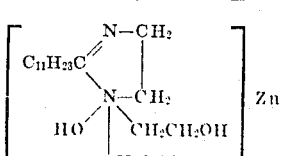

(5) 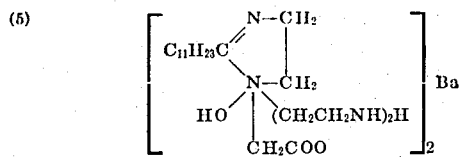

(6) 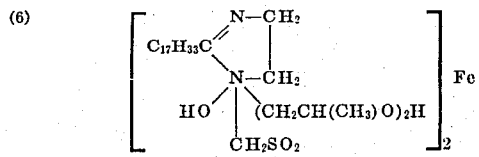

were prepared. Sheet-form moldings were then prepared by mixing and kneading one of these compounds with acrylonitrile-butadiene-styrene copolymer, polystyrene or polyethylene in an amount ranging from 0.5 to 2.0 percent by weight of the weight of the resin. For comparison of the coatability and adhesiveness of the coatings obtained, control sheet-form moldings (blank test pieces) not containing said compounds were also prepared. The respective sheets were divided into groups consisting of those given dewaxing, washing, drying (at 60° C. for 20 minutes) and surface activating treatments; those given dewaxing, washing and drying (at 60° C. for 20 minutes) treatments; and those given no precoating treatment, and then an electrostatic coating was conducted on all sheets of these three groups.

The coating apparatus used had an output of 200 cc/min., a diameter of 15 inches, a revolution speed of 1,500 r.p.m., and a voltage capacity of 90 KV. A coating consisting of commercial alkyd resin was applied onto these sheets by the use of said apparatus.

The results of the comparison of the coatability and the adhesiveness of the coatings between these three groups of sheets are shown in the following table. The comparison of adhesiveness was conducted by first forming, on the coated face of each sheet, 100 mesh-form checkered pattern consisting of lines spaced at 1 mm. intervals, then placing a tape-form adhesive cellulose films thereon, and thereafter stripping the films off the sheet and comparing the counted numbers of meshes remaining on the sheets. Comparison of coatability was performed by observing the degrees of deposition of the coating material on the sheets.

| Resin | Compound number | Amount of compound added (percent) | Coated without precoating treatment | | Coated after dewaxing, washing and drying treatments | | Coated after dewaxing, washing, drying and surface activating treatments | |
|---|---|---|---|---|---|---|---|---|
| | | | Coatability | Adhesiveness | Coatability | Adhesiveness | Coatability | Adhesiveness |
| Acrylonitrile butadiene-styrene copolymer | Blank-test | | X | | Δ | 35 | 0 | 70 |
| | (1) | 0.5 | 0 | 88 | 0 | 90 | 0 | 90 |
| | | 1.0 | 0 | 94 | 0 | 91 | 0 | 96 |
| | | 2.0 | 0 | 95 | 0 | 97 | 0 | 100 |
| | (2) | 0.5 | 0 | 90 | 0 | 92 | 0 | 98 |
| | | 1.0 | 0 | 92 | 0 | 98 | 0 | 100 |
| | | 2.0 | 0 | 100 | 0 | 100 | 0 | 100 |
| | (3) | 0.5 | 0 | 92 | 0 | 93 | 0 | 95 |
| | | 1.0 | 0 | 92 | 0 | 100 | 0 | 99 |
| | | 2.0 | 0 | 98 | 0 | 100 | 0 | 100 |
| | (4) | 0.5 | 0 | 100 | 0 | 100 | 0 | 100 |
| | | 1.0 | 0 | 100 | 0 | 100 | 0 | 100 |
| | | 2.0 | 0 | 100 | 0 | 100 | 0 | 100 |
| | (5) | 0.5 | 0 | 96 | 0 | 96 | 0 | 97 |
| | | 1.0 | 0 | 99 | 0 | 99 | 0 | 99 |
| | | 2.0 | 0 | 100 | 0 | 100 | 0 | 100 |
| | (6) | 0.5 | 0 | 94 | 0 | 96 | 0 | 94 |
| | | 1.0 | 0 | 100 | 0 | 98 | 0 | 100 |
| | | 2.0 | 0 | 100 | 0 | 100 | 0 | 100 |

| Resin | Compound number | Amount of compound added (percent) | Coated without precoating treatment | | Coated after dewaxing, washing and drying treatments | | Coated after dewaxing, washing, drying and surface activating treatments | |
|---|---|---|---|---|---|---|---|---|
| | | | Coatability | Adhesiveness | Coatability | Adhesiveness | Coatability | Adhesiveness |
| Polystyrene | Blank-test | | X | | Δ | 47 | 0 | 76 |
| | (1) | 0.5 | 0 | 90 | 0 | 94 | 0 | 96 |
| | | 1.0 | 0 | 92 | 0 | 95 | 0 | 98 |
| | | 2.0 | 0 | 97 | 0 | 100 | 0 | 100 |
| | (2) | 0.5 | 0 | 96 | 0 | 100 | 0 | 100 |
| | | 1.0 | 0 | 100 | 0 | 100 | 0 | 100 |
| | | 2.0 | 0 | 100 | 0 | 100 | 0 | 100 |
| | (3) | 0.5 | 0 | 94 | 0 | 95 | 0 | 100 |
| | | 1.0 | 0 | 100 | 0 | 98 | 0 | 100 |
| | | 2.0 | 0 | 100 | 0 | 100 | 0 | 100 |
| | (4) | 0.5 | 0 | 91 | 0 | 97 | 0 | 95 |
| | | 1.0 | 0 | 93 | 0 | 97 | 0 | 97 |
| | | 2.0 | 0 | 99 | 0 | 99 | 0 | 100 |
| | (5) | 0.5 | 0 | 100 | 0 | 98 | 0 | 100 |
| | | 1.0 | 0 | 100 | 0 | 100 | 0 | 100 |
| | | 2.0 | 0 | 100 | 0 | 100 | 0 | 100 |
| | (6) | 0.5 | 0 | 94 | 0 | 98 | 0 | 92 |
| | | 1.0 | 0 | 98 | 0 | 100 | 0 | 98 |
| | | 2.0 | 0 | 100 | 0 | 100 | 0 | 100 |

X = poor coatings.
Δ = fairly good coatings.
0 = good coatings.

| Resin | Compound number | Amount added (percent) | Coated without precoating treatment | | Coated after dewaxing, washing and drying treatments | | Coated after dewaxing, washing, drying and surface activating treatments | |
|---|---|---|---|---|---|---|---|---|
| | | | Coatability | Adhesiveness | Coatability | Adhesiveness | Coatability | Adhesiveness |
| Polyethylene | Blank test | | X | | △ | 32 | 0 | 68 |
| | (1) | 0.5 | 0 | 84 | 0 | 91 | 0 | 98 |
| | | 0.7 | 0 | 90 | 0 | 94 | 0 | 100 |
| | | 1.0 | 0 | 96 | 0 | 99 | 0 | 100 |
| | (2) | 0.5 | 0 | 89 | 0 | 96 | 0 | 97 |
| | | 0.7 | 0 | 94 | 0 | 96 | 0 | 97 |
| | | 1.0 | 0 | 100 | 0 | 99 | 0 | 100 |
| | (3) | 0.5 | 0 | 91 | 0 | 89 | 0 | 91 |
| | | 0.7 | 0 | 92 | 0 | 95 | 0 | 100 |
| | | 1.0 | 0 | 92 | 0 | 100 | 0 | 100 |
| | (4) | 0.5 | 0 | 100 | 0 | 99 | 0 | 98 |
| | | 0.7 | 0 | 100 | 0 | 100 | 0 | 99 |
| | | 1.0 | 0 | 100 | 0 | 100 | 0 | 100 |
| | (5) | 0.5 | 0 | 100 | 0 | 100 | 0 | 100 |
| | | 0.7 | 0 | 100 | 0 | 100 | 0 | 100 |
| | | 1.0 | 0 | 100 | 0 | 100 | 0 | 100 |

X=poor coatings.
△=fairly good coatings.
0=good coatings.

As shown in the above table, by the application of the method of the present invention, it is possible to perform a coating comparable to a coating of the prior art which includes the steps of the named precoating treatments, even when the precoating treatment, which has been indispensable with the conventional electrostatic coating methods, is omitted.

The embodiments of the invention in which an exclusive property or privilege is claimed are defined as follows:

1. A method which comprises electrostatically applying a coating material to a molded object made of an electrostatically coatable synthetic resin selected from the group consisting of acrylonitrile-butadiene-styrene copolymers, acrylonitrile-styrene copolymers, polystyrene, polyethylene, polypropylene, polyvinyl chloride and polycarbonate, said resin containing admixed therein from about 0.1 to about 5 percent by weight of the resin, of an amphoteric surface active agent of the formula

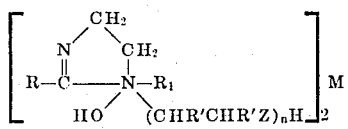

wherein:
R is a hydrocarbon radical having seven–21 carbon atoms,
R' is selected from the group consisting of H and $CH_3$,
Z is selected from the group consisting of —O— and —NH—,
M is a metal ion selected from the group consisting of Mg, Ca, Zn, Ba and Fe,
$R_1$ is selected from the group consisting of —$R_2COO$—, —$R_2SO_3$— and $R_2OSO_3$— (wherein $R_2$ is selected from the group consisting of —$CH_2$—, —$C_2H_4$— and —$C_3H_6$—),
n is a number from 0 to 3.

2. A method according to claim 1, wherein said electrostatic coating is performed on said article to be coated containing said amphoteric surface active agent, without giving said article a precoating treatment.

3. A method according to claim 1, wherein said amphoteric surface active agent is a compound in which R is a hydrocarbon radical containing from 11 to 17 carbon atoms.

4. A method according to claim 1, wherein said article to be coated is an acrylonitrile-butadiene-styrene copolymer.

5. A method according to claim 1, wherein said article to be coated is polystyrene.

6. A method according to claim 1, wherein said article to be coated is polyethylene.

* * * * *